Feb. 17, 1953      F. HAALCK      2,629,003
MAGNETOMETER
Filed March 18, 1952      2 SHEETS—SHEET 1
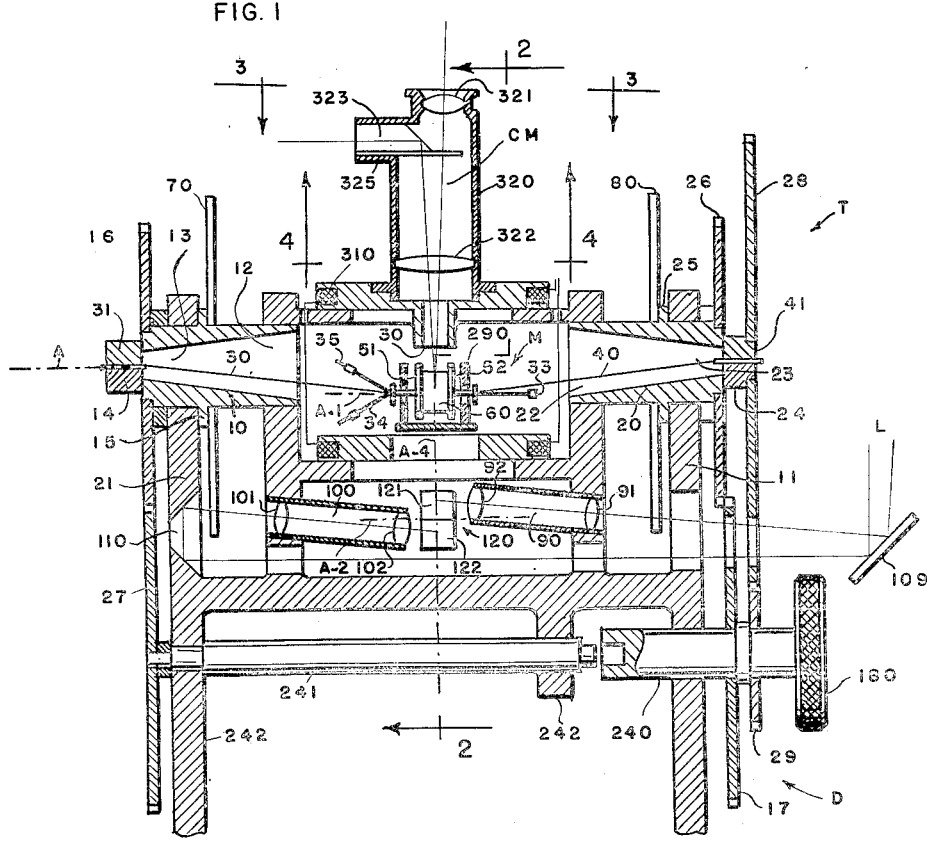
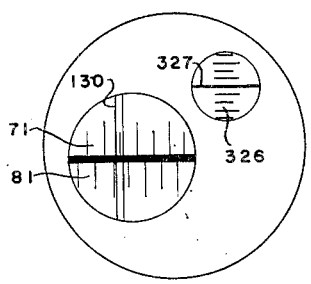
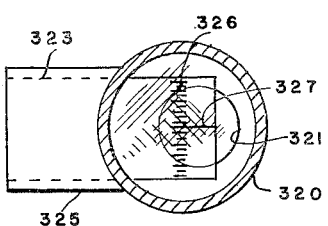
*INVENTOR.*
FRITZ HAALCK.
BY F. D. Prager
ATT'Y.

Feb. 17, 1953  F. HAALCK  2,629,003
MAGNETOMETER

Filed March 18, 1952  2 SHEETS—SHEET 2

INVENTOR.
FRITZ HAALCK
BY
ATT'Y.

Patented Feb. 17, 1953

2,629,003

UNITED STATES PATENT OFFICE 2,629,003

MAGNETOMETER

Fritz Haalck, Berlin-Wilmersdorf, Germany, assignor to Askania-Werke A. G., Berlin, Germany, a corporation of Germany Application March 18, 1952, Serial No. 277,331
In Germany April 7, 1951

16 Claims. (Cl. 175—183)

This invention relates to a magnetometer of the type wherein magnetic forces are balanced by wire torsion, and optically determined.

Such instruments have been known for considerable time. They are considered as precision instruments. The present invention adds greatly to the degree of precision achieved by such an instrument, while utilizing very simple, inexpensive, readily standardizable devices.

One of the peculiar problems of precision magnetometers is that all readings usually must be made at least twice, with 180 degree reversals of the small, sensitive needle, coil or other magnet, because of unavoidable nonconformities between centerlines of suspension, gravity, magnetism and optical reflection in the magnet and mirror system. This involves a need for rapid, wide range wire torsion, followed by slower, narrower and more accurate torsion. Heretofore, available accuracies were impaired mainly by the fact that the mechanism for successive rapid and slow torsion adjustments, which is inherently somewhat loose and subject to machining errors, was also used to indicate the degree of torsion. A result of said looseness was that each reading had to be made at two diametrically opposed points of the driving and indicating system. A result of said machining errors was that some inaccuracy remained even in case of such two point reading, that is, with 180 degree reversals even in case of fourfold readings. In these and other respects the new instrument is simplified and improved.

Figure 2:
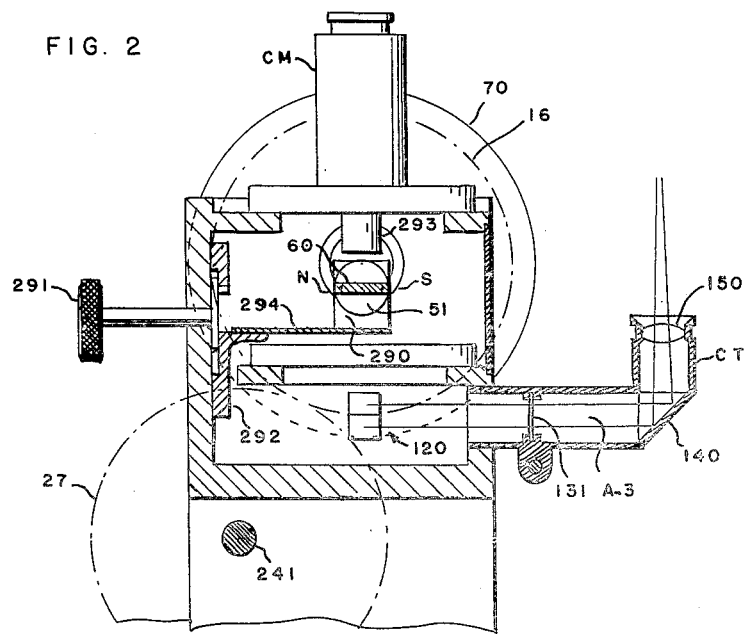
Figure 7:
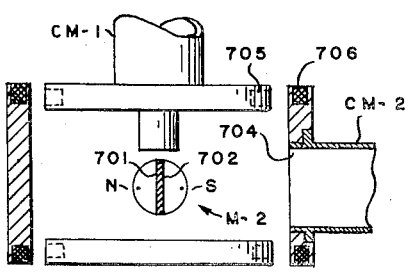
Figure 8:
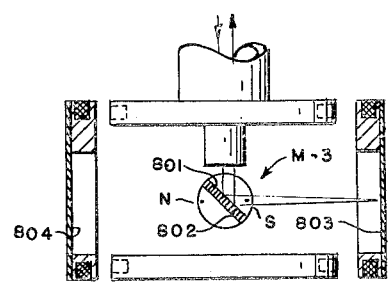

The drawing is purely diagrammatic. Fig. 1 is a vertical central cross-section through an instrument in accordance herewith. Fig. 2 is a section along lines 2—2. Fig. 3 is a view along lines 3—3. Fig. 4 is a section along lines 4—4. Figs. 5 and 6 show a modified detail, in views corresponding respectively to Figs. 1 and 2. Fig. 7 shows a further, modified detail, in a view corresponding to Fig. 2. Fig. 8 shows a still further modified detail in a similar view.

Figs. 1 to 3 show a simple form of apparatus hereunder. In this description and the claims appended such apparatus is identified as a magnetometer. The apparatus is specially adapted for determinations of inclination and vertical field intensity, and may be called by other names, such as inclinometer.

In this device a magnet system M is suspended by and between a pair of horizontally aligned torsion heads T. The position of the magnet system M—generally a null position or slight deflection therefrom—is observed by an autocollimator telescope CM. The position of the torsion heads, which is varied by simple drive means D, to produce said position of the magnet system, is observed by a collimating precision viewer system CT, independent from the drive means D.

The torsion system T comprises a pair of nonmagnetic hollow torsion heads 10, 20 having a joint, horizontal axis A. Both heads are pivoted around said axis, in bearings 11, 21. They are spaced from one another along said axis. The two torsion heads have open, inner ends 12, 22 opposite one another and adjacent the magnet system M. They have outer ends 13, 23 with closures 14, 24.

At the exact point where each closure 14, 24 is intersected by the axis A, the closure has rigidly attached thereto, by a fitting 31, 41, the outer end of a torsion wire 30, 40, formed by a silk filament, a quartz thread, a metal band or the like, the inner end of which is rigidly attached to the magnet system M. In this manner a bifilar, horizontal suspension of the magnet system is provided.

The magnet system M as shown comprises a pair of parallel permanent magnets 51, 52. These magnets are formed as identical flat, circular discs, coaxially spaced from one another and connected together, as by cementing or the like, by means of a small, flat, two-sided mirror 60 which extends substantially diametrically of these discs, in the direction of their magnetic axes N—S. While being small and light, the magnet system M keeps the inner ends of the thin supporting torsion wires 30, 40 slightly below the axis A, as indicated. The axis A-1 of the discs 51, 52 is parallel with the main torsion axis A.

The entire magnet system is statically balanced about the axis A-1, as accurately as possible. For this purpose, adjustable counterweights are secured to the magnet system. Preferably the counterweights consist in small, interiorly threaded discs, and the adjustment devices are thin, threaded shafts or wires; one such threaded shaft extending from one side of system M in the direction of axis A-1, the other two such shafts extending from the other side of the system M, and the three shafts being more or less vertical to one another in order to balance the system M along as well as about the axis A-1. Any discrepancies between the true and the theoretical center of gravity can thus be corrected, three-dimensionally, and the effective center of gravity can be placed accurately in the center of axis A-1.

Each torsion head 10, 20 has coaxially secured thereto a thin, transparent protractor or graduated glass disc 70, 80, of large diameter. Central parts of these discs are rigidly secured to shoulders 15, 25 on the outsides of the torsion heads. Peripheral parts of the discs are marked with suitable graduations 71, 81. These graduations represent degrees of inclination of the magnet axis N—S, with substantial magnification by virtue of the flexibility of the torsion wires. The torsion collimator CT provides further magnification. Therefore the angle of static inclination as well as the angles of dynamic oscillation of the magnet axis N—S can be observed with great accuracy. Moreover such accuracy is not impaired by any errors such as machining tolerances in torsion adjustment means, inasmuch as the ends of the vital torsion wires 30, 40 are rigidly attached to the optical objects under direct observation—the mirror 60 and protractors 70, 80.

The torsion collimator CT comprises objective lens means 90 opposite and adjacent to the lowermost graduations on one protractor 80, and objective lens means 100 similarly cooperating with the other protractor 70. Both lens means 90, 100 are shown as rigidly installed between and below the two torsion heads. The inside protractor surfaces and graduations opposite these objectives are illuminated by light from a light source L, which may be suitably directed to and through the glass discs by reflecting means 109, 110. Each objective lens means, as diagrammatically shown, may comprise a relay viewing system; for instance the objective lens means 90 may have a first objective lens 91 directly in front of the respective glass disc and a second objective lens 92 adjacent the centerline of the instrument. The other objective lens means 100 may have similar lenses 101, 102. The outer primary objective lenses 91, 101 have a common, horizontal axis A-2, while the inner or secondary objective lenses 92, 102 are slightly and symmetrically superposed above and below that axis, respectively. Between and opposite the inner objective lenses 92, 102, a system 120 of superposed mirrors, reflecting prisms or other reflecting means 121, 122 is installed, by well known means not shown, to direct light from the objectives into a passage A-3 which centrally intersects the axis A-2 at right angles thereto. The foci of both objectives 90, 100 lie in the passage A-3 and coincide with vertical hair lines 130 on a glass slide or collimating device 131, which also coincides with the focus of an eye-piece system shown as comprising a reflecting prism 140 and an ocular lens 150. Thus a double relay objective microscope 90, 100, 150 is trained on the torsion-indicating glass protractors 70, 80. The eye-piece 140, 150 of this microscope is desirably directed upwards, or approximately so, as is the magnet autocollimator CM. It provides a single field of vision for both sets of torsion graduations 71, 81 and for the hair line marking 130, as shown in Fig. 3.

The glass protractors 70, 80, together with their torsion heads 10, 20, are shown as being rotated in the bearings 11, 21 of the latter, by spur gears coaxially mounted on the torsion heads. For rapid, approximate pre-setting or rotation of the magnet system M over an appreciable angular distance, such as 180 degrees, the two torsion heads 10, 20 carry identical spur gears 16, 26, adapted to be driven simultaneously and rapidly for instance at a 1:1 ratio, by spur gears 17, 27 on a horizontal shaft 240 parallel with axis A. For the slower, precision adjustment of wire torsion, one torsion head 20 carries, coaxially, a further, larger spur gear 28, adapted to mesh with a smaller spur gear 29 on the shaft 240. The ratio of gears 28, 29 may be for instance 10:1. The arrangement is such that when the gears 28, 29 are in mesh the gears 16, 17 and 26, 27 are out of mesh, and vice versa. For this purpose the shaft 240, or a part 241 thereof, is both rotatable and reciprocable in suitable bearings 242. One end of the shaft 240 is rotated and/or reciprocated, for instance manually by a knurled knob 180. This knob carries no graduations. It can be made small and inexpensive.

The autocollimator CM for the magnet system M comprises an astronomic telescope 320 opposite the mirror 60, with an eye-piece 321 which, as mentioned, may face in a similar direction as does the eye-piece 150 of the torsion microscope. Between the eye-piece 321 and the objective lens 322 of this telescope, the telescope tube has a side opening 323. This opening contains a transparent and light guiding scale and index plate 324 and a light beam guiding and reflecting scale illuminator 325, both of which extend into the telescope tube. The index plate 324 has formed thereon, on one side of the telescope objective axis A-4, suitable scale graduations 326 for the null abberation of the mirror 60, and on the opposite side of said axis, a suitable index mark 327 for said graduations. Both devices 326, 327 substantially coincide with the common focus of the two telescope lenses. The two sides mentioned follow one another in the direction of the magnet and mirror axis A-2; and the graduation and index lines run in the same direction. Thus the autocollimator shows the index 327 at a fixed location but causes the graduations 326 to shift relative thereto, in response to angular movements of the mirror 60 about the axis A-2. Even minute angular movements of the mirror can thus be observed, while the astronomic telescope 320 is insensitive even to major vertical or horizontal movements of the mirror due to vibrations or the like.

In order to calibrate the scales, mainly of the torsion collimator CT, I provide the usual Helmholtz coil unit 310, surrounding the magnet M and having a vertical axis.

When the instrument is not in use, the magnet system M may be immobilized and protected from vibration or the like by a fork 290, actuated by a knob 291 through an eccentric 292 to press the top edges of the magnet discs against a stop 293. This fork may also serve to dampen the oscillations of the magnetic system, and may therefore have side plates 294 of copper or the like, adapted to have suitable currents induced by actual or incipient oscillations of the magnet M.

To start a measurement, the knob 291 can be turned rapidly to a position in which the fork 290 has no contact with the magnet system M and torsion wires 30, 40; the resulting non-angular mirror vibrations are harmless, as mentioned. Likewise further operations, like axial shifting and rapid rotation of knob 180, can be performed rapidly and without any special attempt to avoid vibrations of the torsion wires and mirror 60.

When a suitable horizontal orientation has been selected, the magnet system M will tend to have its axis N—S inclined in accordance with the normal terrestrial inclination for the area and period in question, as modified by any geophysical or cosmic irregularities. In order to determine the exact inclination for the point and moment in question it is often best to proceed as follows: knob 180 is pushed to left as seen in Fig. 1 and turned until the scale 326 appears in the autocollimator eye-piece 321. Knob 180 is then pulled back and turned further until the null position is established at 327. It is then noted, in the microscope eye-piece 150, what torsion has been applied by both torsion heads, and what further torsion has been applied by one of the heads. The micrometer slide 130 may be used to facilitate this reading. (This is evaluated later, in the light of calibrating measurements with the Helmholtz coil.) The knob 180 is then pushed back; the entire torsion system is rapidly turned back by 180 degrees; the knob 180 is pulled out again; the turning of the torsion system is continued until a null position reappears at 321; and the new torsion values are noted. (They usually differ slightly from those noted before due to slight irregularities in the magnetic axis N—S. For exact evaluations, a mean value between the two readings is computed).

Next, the vertical intensity may be observed. For this purpose the magnet system is held to the stop 310 by the knob 291; the torsion system is rotated a suitable, usually small amount by the knob 180; the magnet system is released by the knob 291; the ensuing oscillations of the scale 326 across the marker 327 are counted for a predetermined period of time; and the oscillating frequency of the magnet system is computed from this count (for suitable, subsequent evaluation).

These operations may be repeated at identical or changed observation posts, and with or without allowance for diurnal and other variations.

The details of the apparatus and procedure described are subject to numerous modifications, depending for instance on the more specific local purposes of navigation, geophysical exploration etc. Particularly the accuracy range is subject to wide variation, depending mainly on the magnification of the torsion microscope and the fineness of the torsion wires, but not practically depending at all on the construction or operation of the torsion adjusting knob shaft, gears or other mechanisms. Further some or all of the readings can be effected otherwise than described; for instance photoelectrically or photographically. The null point can be suppressed. The protractor readings can be transmitted by other viewing devices. The vibration period of the magnet can be varied by further manipulation of knob 291 and side walls 294; and a number of other changes can be applied.

Thus it will be seen that a simple standardizable instrument has been provided which is suitable for readings with either substantial or extreme sensitivity and precision, requiring practically no change in the mechanical parts. In earlier, generally comparable instruments known to the art, the extreme sensitivity provided hereby was unavailable and high magnification torsion microscopes or magnet telescopes would have been useless, because the field balancing force was determined indirectly, and subject to sources of error such as friction of needle journals on their knife edges, looseness of driving gear for torsion adjusters, and the like. It is therefore believed that in the present instrument the inherent measuring accuracy of a torsion balance device is utilized to a fuller extent than it has been in the past. Certainly the required measurements can be carried out much faster and simpler than before.

Modified forms of autocollimator mirrors are shown in Figs. 5 to 8.

In Figs. 5, 6 the magnet and mirror system M–1 has not only two but four mirror surfaces 501, 502, 503, 504, shown as formed on a bar 505 of square cross-section with a central cylindrical hole 506, coaxial with the magnet discs 507, 508. The magnetic axis N—S in both magnet discs is parallel to two of the mirror surfaces 501, 503, which are used as described above. The other two mirror surfaces 502, 504 allow the instrument to determine also the declination, horizontal intensity, and total force.

In Fig. 7 the magnet and mirror system M–2 has only two mirror surfaces 701, 702 on a flat mirror, as before, but is still able to make all the determinations possible in Figs. 5 and 6. To this effect, provision is made for autocollimator reading of the single mirror either vertically through an opening 703, as before, or horizontally through an opening 704 which is accurately at right angles to 703. Separate or interchangeable or movable autocollimator telescopes, or equivalent devices can be used. The mirror surfaces may be parallel to the magnet axis N—S or to the axis which is formed by the other principal coordinates of the magnet system, which is normal to the axis N—S.

Inasmuch as the horizontal intensity in many regions differs widely from the vertical intensity of the terrestrial field, it may be desirable in horizontally or vertically reading instruments to provide separate calibrating Helmholtz coils 705, 706 with horizontal and vertical axes respectively.

In Fig. 8 the magnet system M–3 has two mirror surfaces 801, 802 on a flat mirror, at 45 degrees to the magnetic axis N—S. Accurate horizontal and vertical calibration and reading is obtained, with a single, vertical autocollimator telescope as in Fig. 1 and with two Helmholtz coils as in Fig. 7, by the further expedient of providing a pair of flat stationary mirrors 803, 804 with a common horizontal axis, bisected by the suspension axis A–1 of the magnet system. When this system is positioned as shown the autocollimator light beam passes from the index plate to mirror surface 801, then to 803, back to 801 and then through the telescope. The accuracy of reading null aberrations of the mirror is doubled; extra cost for a second telescope and attachment thereof is avoided.

The magnet system with a single mirror plate, instead of a square bar, has the advantage that it involves a minimum of mass, requiring also a minimum of balance adjusting mass, thereby allowing the use of particularly flexible torsion wires and adding to the sensitivity and available sharpness of dynamic response.

Further modifications can be applied in the light of this disclosure. I claim:

1. A magnetometer comprising a pair of torsion wires; a magnet therebetween, secured thereto, balanced thereon about a horizontal axis and having a magnetic axis intersecting said horizontal axis at right angles; a pair of torsion heads having a common horizontal axis and having the outer ends of the torsion wires centrally secured thereto; adjustment means to revolve at least one of said torsion heads about its axis; means to show the angular position of the magnet; and a protractor rigidly and peripherally secured to the revoluble torsion head, whereby the torsion of the torsion wires is directly indicated, independently of the adjustment means.

2. A magnetometer according to claim 1, wherein the maget comprises generally cylindrical permanent magnet means diametrically magnetized and axially secured to the torsion wires; and the means to show the angular position of the magnet comprises a flat mirror symmetrically secured to the magnet for deflection of light in a plane approximately parallel with that of the magnetic axis.

3. A magnetometer according to claim 2 wherein the permanent magnet means comprises a pair of thin, coaxial discs and the mirror comprises a flat plate extending between and secured to the two discs, parallel with the axis of the discs and balanced relative thereto.

4. A magnetometer according to claim 3 wherein the flat plate has parallel mirror surfaces on both sides and the adjustment means comprises separate, rapid and slow drive means for the protractor.

5. A magnetometer according to claim 3 wherein the flat plate extends parallel to one of the four principal coordinates of the magnet, and the means to show the position of the magnet comprises an autocollimator the object axis of which is vertical.

6. A magnetometer according to claim 2 wherein the mirror comprises a bar with square cross-section, coaxial with the cylindrical permanent magnet means, each of the four side surfaces of the bar having a mirror surface thereon and being parallel with one of the four principal coordinates of the magnet.

7. A magnetometer according to claim 6, wherein the mirror bar has a central, generally cylindrical bore hole extending from end to end of the bar and the magnet comprises a pair of thin, coaxial discs fitted into the ends of the bore hole.

8. A magnetometer comprising a pair of torsion wires; a magnet therebetween, secured thereto, and three dimensionally balanced thereon; a pair of torsion heads having a common horizontal axis, having their respective centers rigidly secured to the outer ends of the torsion wires, and having angular graduations on their respective outer peripheries; adjustment means to revolve each torsion head about its axis; means to show the angular position of the magnet; and means to observe the positions of the angular graduations independently of the adjustment means.

9. A magnetometer according to claim 8 wherein the adjustment means comprises presetting means to revolve both torsion heads at substantially identical, relatively rapid rates, and precision setting means to revolve only one torsion head at a relatively slow rate; the presetting means and the precision setting means being adapted to be driven by a single actuator.

10. A magnetometer according to claim 8 wherein the adjustment means are spur gears and the actuator comprises a revoluble and axially shiftable shaft having such gears mounted thereon, and a manual knob at one end of the shaft.

11. A magnetometer comprising a pair of relatively rotatable, hollow torsion heads having a common horizontal axis of rotation and having protractors concentrically secured to their outsides; a torsion wire rigidly and centrally secured to the inside of each torsion head; an autocollimator telescope, the objective axis of which intersects said horizontal axis; and a magnet-mirror system suspended and balanced on said torsion wires at said intersection and having a magnetic axis transverse of said horizontal axis and at least one substantially flat mirror surface parallel with said horizontal axis to provide an autocollimator mirror and thereby to indicate the position of the magnet in the vertical plane of the magnetic meridian; the relative angular positions of the torsion heads being directly indicated by the protractors.

12. A magnetometer according to claim 11 additionally adapted to have an autocollimator telescope secured thereto with its main axis intersecting the aforementioned axes at 90 degrees; and the magnet-mirror system comprising a single, flat mirror plate balanced about the horizontal axis, with mirror surfaces on both sides.

13. A magnetometer comprising a pair of torsion wires; a magnet therebetween, secured thereto, and balanced thereon; a pair of torsion heads having a common horizontal axis of torsion; said heads having the outer ends of the torsion wires secured to their respective centers and having protractors concentric therewith and forming their respective peripheral parts; adjustment means to revolve each torsion head about its axis; means to show the angular position of the magnet; and a collimating microscope having two object lenses focused respectively of the two protractors and a single eye piece, whereby the torsion of the torsion wires is shown independently of the adjustment means.

14. A magnetometer according to claim 13, additionally comprising a slide at the common focus of the objective lenses and the eye piece, with at least one hairline across said slide, and means to shift the slide across the field of view of the microscope.

15. A magnetometer comprising a pair of substantially horizontal torsion wires; a magnet-mirror system secured there-between and substantially balanced thereon, with the magnetic axis across the wires and with a mirror surface substantially at 45 degrees to the magnetic axis; a pair of torsion heads, having the outer end parts of the wires secured thereto; means to rotate at least one of said torsion heads about such end parts in order to return the magnet-mirror system, upon magnetic deflection thereof, to predetermined positions; an indicator for the rotary positions of the torsion heads; a pair of mirrors having mirror surfaces parallel with and facing the wires; and an optical system having an optical axis across the magnet-mirror system, whereby either of the parallel mirror surfaces reflects light over the magnet-mirror system into the optical system, upon a 90 degree rotation of the magnet-mirror system, so that both vertical and horizontal intensities can be indicated by said indicator for the rotary positions of the torsion heads.

16. A magnetometer according to claim 15 wherein the optical system substantially consists in an astronomical autocollimator telescope the objective axis of which is substantially parallel with the mirror surfaces of said pair of mirrors.

FRITZ HAALCK.

REFERENCES CITED

The following references are of record in the file of this patent:

UNITED STATES PATENTS

| Number | Name | Date |
| --- | --- | --- |
| 2,151,627 | Vacquier | Mar. 21, 1939 |
| 2,487,047 | Farnham | Nov. 8, 1949 |
| 2,501,538 | Ruska | Mar. 21, 1950 |
| 2,550,719 | Raspet | May 1, 1951 |